United States Patent

[11] 3,628,663

[72] Inventors James J. Derham
 Dresher;
 Edward R. Morgan, Havertown, both of Pa.
[21] Appl. No. 62,048
[22] Filed Aug. 7, 1970
[45] Patented Dec. 21, 1971
[73] Assignee Klenzoid Inc.
 Philadelphia, Pa.

[54] AUTOMATIC CONTROL SYSTEM FOR COOLING TOWERS
 3 Claims, 5 Drawing Figs.
[52] U.S. Cl. .................................................. 210/141,
 210/278, 210/425, 261/5, 210/151
[51] Int. Cl. .......................................................... B01d 29/38
[50] Field of Search .......................................... 210/57–61,
 82, 138, 141, 142, 278, 424–426, 71, 152, 151;
 261/DIG. 11, DIG. 46, 5, 6

[56] References Cited
 UNITED STATES PATENTS
3,207,312  9/1965  Griswold .................... 210/278 X
3,195,726  7/1965  Saurenman et al. .......... 210/425 X
3,497,453  2/1970  Yurdin ....................... 210/60 X OTHER REFERENCES
Betz: Handbook of Industrial Water Conditioning, Fifth Edition, 1957, pp. 159–166 and 174

Primary Examiner—Reuben Friedman
Assistant Examiner—Thomas G. Wyse
Attorney—Synnestvedt & Lechner ABSTRACT: A completely automatic control system for maintaining the chemical integrity of fluids used in a recirculation-type water cooling system such as a cooling tower used to dissipate heat from a gas condenser. In addition to maintaining the chemical purity of the recirculating coolant, the present system automatically filters dirt from the system thus preventing the clogging of vital flow paths therethrough. Chemicals added to the system are periodically refurbished so as to maintain a constant level of concentration thereby effectively combating corrosion, scale formation and the growth of micro-organisms. Filtering of a portion of the recirculating coolant is continuous, being interrupted only for the purpose of backwashing the filter. The backwash operation is effected using the recirculation coolant thus simultaneously effecting bleed off from the system.

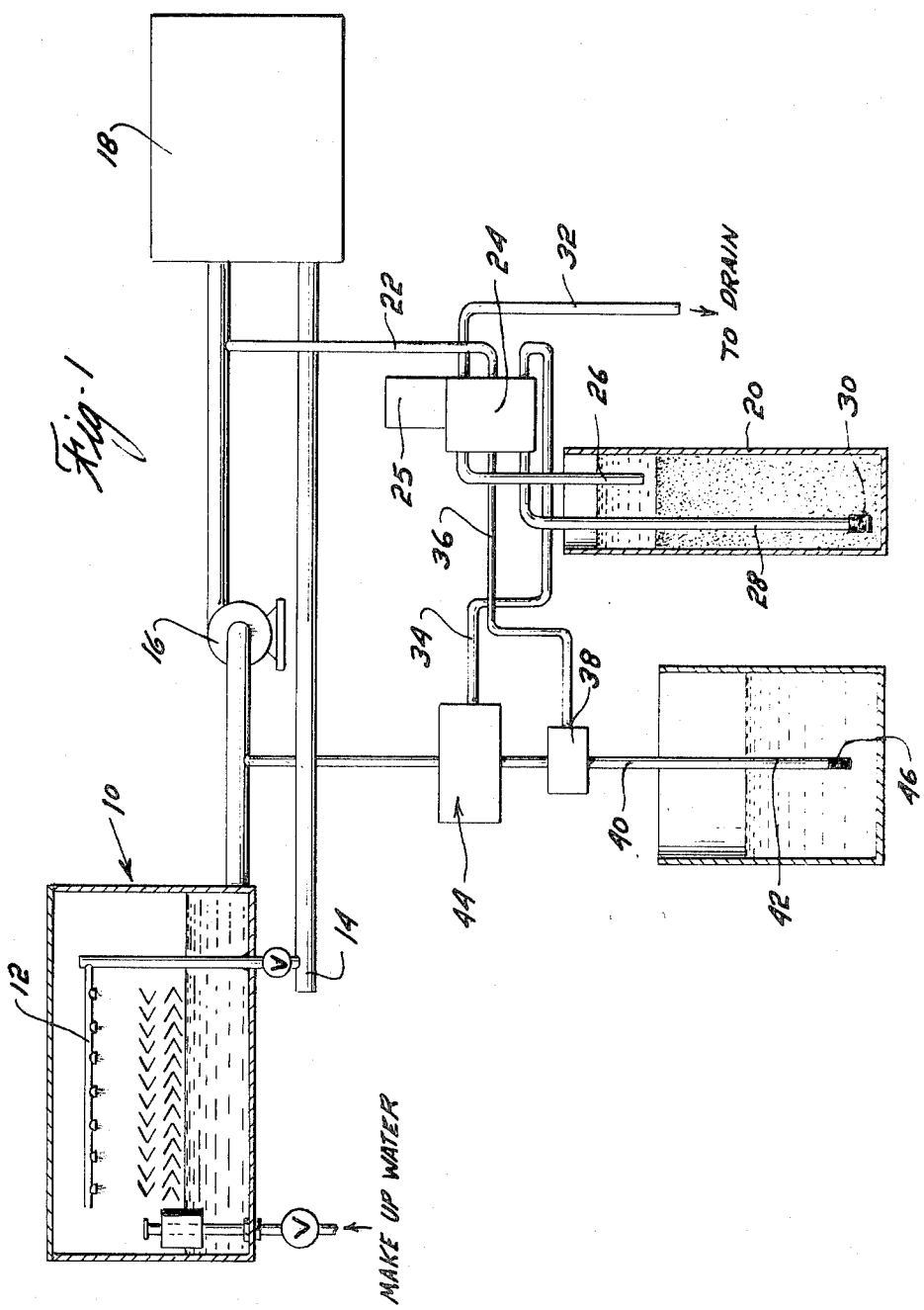

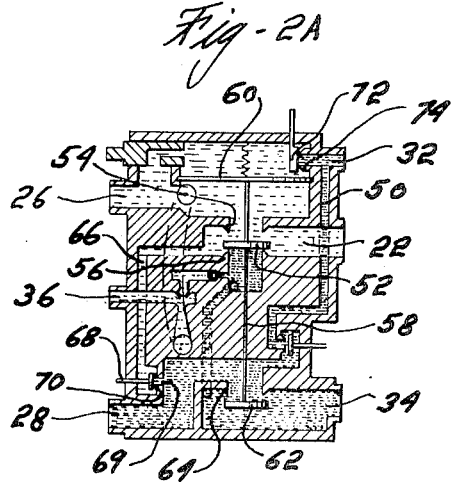
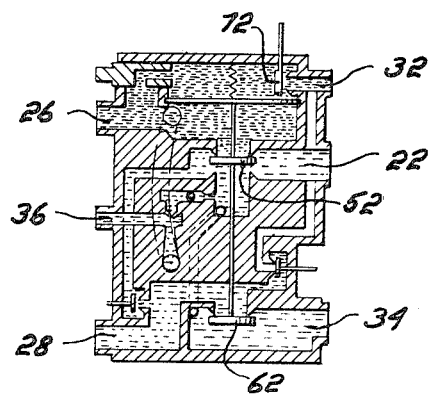
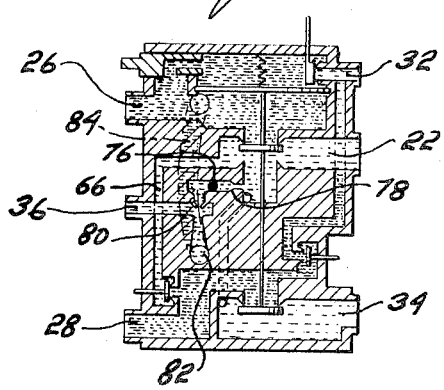
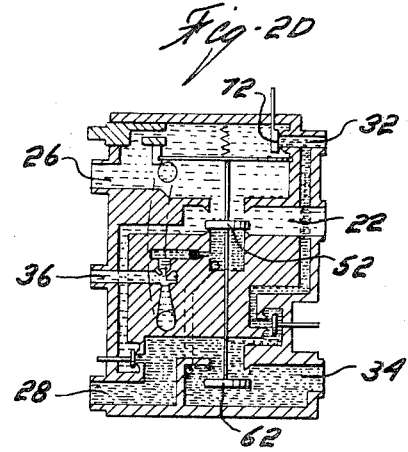

AUTOMATIC CONTROL SYSTEM FOR COOLING TOWERS

A cooling tower, as utilized to dissipate thermal energy generated in a condenser-type cooling system, may be characterized by its mechanical design parameters; however, its efficiency in operation plus the amount of manual intervention required to monitor its operation are more determinative of its overall utility. The present invention is directed to an improved cooling tower wherein the efficiency of operation is reflected in the automatic nature in which the system functions.

The cooling tower in a condenser-cooling system is designed to release heat energy by evaporating a portion of the water used to convey the heat from the condenser. This results in a concentration of minerals in the remaining water. In addition, pollutants and airborne bacteria are generally introduced into the system during the process of evaporation.

The concentrated chemicals, and the materials introduced through the air, plague cooling towers in essentially four different ways; namely through: corrosion, scale formation, microbiological growth, and dust and dirt. In addition to decreasing the life of the equipment, the above-enumerated problems result in a reduction in the heat transfer rate of the cooling tower. This in turn results in system shut down, expensive maintenance and loss of use of the equipment, usually when it is most needed. Heretofore it has been common to treat the aforementioned problems by a variety of techniques including the hand-feeding, and in certain instances automatic feeding, of chemicals into the system. These techniques have been partially effective in dealing with the first three of the problems. Bleed off and bypass filtration are alternative techniques employed to cope with these problems.

The present invention includes means to perform the above indicated functions automatically and in a manner which enhances the operational efficiency of the system.

Accordingly, it is a primary object of the present invention to provide a method and means for monitoring the makeup of fluid circulating in the water tower of a condenser-cooling system and for automatically regulating the same without the need of manual intervention.

The preferred embodiment of the present invention embodies means associated with a bypass filtration path, which means includes a filter in combination with a solenoid-actuated valve programmed to periodically cycle the filter through a self-cleansing operation. In addition to the filter and control valve, certain other members are provided for storing and selectively conveying the fluids through the system.

Another more specific object of the present invention concerns means including a filter and a programmed control valve for use in a water tower to automatically perform maintenance operations; including the cleaning and treating thereof.

In the preferred embodiment of the present invention the filter operates continuously to filter a small portion of the recirculating cooling water. In so doing, the filter removes dirt from the system thus precluding the necessity to periodically shut down the system for cleaning. The programmable solenoid actuated valve is connected into the system in such manner that periodically the direction of flow of water flowing through the system is reversed such that the materials entrapped in the upper strata of the filter are backflushed and removed from the system. This operation conveniently accomplishes both bleed off and backwash of the system. The backwash and bleed off operation continues for a predetermined period of time, which period is variably set by way of the programmable control valve.

After the backwash and bleed off operation the programmed control valve initiates the transfer of chemicals from a chemical storage tank to the system. The quantity of chemicals added is properly proportioned to protect the system against corrosion, scale formation and biological growth. In the preferred embodiment of the present invention a rinse cycle is conducted before the system returns to the bypass filter position. During the rinse cycle the total quantity of bleed off water is adjusted.

It is accordingly another more specific object of the present invention to provide means operative in conjunction with a condenser-cooling system for automatically maintaining the chemical integrity of water used in the cooling tower portion thereof which means includes a bypass filter path for continuously filtering a small portion of the water passing through the cooling tower and a programmable control valve positioned in said bypass filter path which control valve is automatically positioned at periodic intervals to perform the functions of backwashing the filter, adding chemicals to the system to combat contamination thereof, and for rinsing the system.

Details of the foregoing objects and of the invention, as well as other objects thereof, are set forth in the following specification and illustrated in the accompanying drawings comprising a part thereof.

Referring now to FIG. 1, therein is disclosed a diagrammatic representation of a preferred embodiment of the present invention in which the elements thereof are connected in combination with a conventional recirculation type water cooling system. The recirculation-type water-cooling system comprises a cooling tower 10 including a sprinkler assembly 12 fed by a conduit 14. As indicated above, a portion of the fluid emitted from the sprinkler head 12 evaporates, absorbing heat in the process, and effecting a proportionate reduction in the temperature of the balance of the fluids in the system. The cooled water is recycled in a primary flow path through a pump 16 to a condenser 18 which supplies heat to the cooling fluid as it circulates therethrough. The cycle is completed as the heat laden fluid is returned by way of the line 14 to the cooling tower.

In addition to the primary flow path of fluids through the system there is a secondary flow path which continuously channels a small portion of the recirculating cooling water away from the main flow path. Included in the secondary flow path is a filter which may be of the conventional sand-filter type and which primarily functions to remove dirt from the system thus eliminating cleaning. The cooling fluid is directed to the filter 20 by way of an inlet line 22. The inlet line is in turn connected to a time adjustable control valve 24 the timer portion of which is indicated generally as member 25. One of the multiple outlets of the control valve 24 serves as an inlet to a line 26 leading to the filter tank 20. A second line 28 extends the entire depth of the filter tank 20 and terminates in a combination check valve filter 30 which functions in a manner such that fluids are permitted to flow both ways through the line 28 while the filtering material is prevented from doing so.

A line 32 serves to carry away bleed off water from the system. As indicated above, the bleed off water also serves to backwash the filter. The line 32 flows into a drain not shown. Another line 34 is provided to carry the water treated in the system back to the primary flow path of the system.

Also leading from the control valve 24 is an hydraulic control line 36, which carries a vacuum signal generated in the control valve to a solenoid-actuated hydraulic valve 38. The valve 38 is connected in a line 40 serving to feed chemicals from a tank 42 through an ejector 44 and from thence to the return side of the pump 16 connected in the primary flow path of the water-cooling system. Attached to the chemical tank end of the line 40 is a check valve 46 of conventional design which permits fluids to leave the tank by the line 40 but not to return therethrough.

Before proceeding with an explanation of the operation of the system disclosed in FIG. 1, reference will be made to FIGS. 2A through 2D which disclose the details of construction and various operating positions assumed by the control valve 24 in the practice of the present invention. The construction of the control valve 24 is not unique; however, its use in the present system and the functions served thereby are unique as is the function of the present invention.

Inasmuch as selectively programmable multipositionable control valves in the nature of member 24 are available and may be readily modified to perform the distribution of flow relied upon in the practice of the present invention no extensive discussion of the details of construction of the control valve is deemed necessary. Rather, explanation will be limited to the major components comprising the valve assembly and the flow paths established therethrough in the various phases of operation of the valve. Likewise, no detailed explanation of the operation or construction of the timing mechanism 25 is given since such mechanisms are generally designed to operate with the particular valve assembly with which they are offered, and as such, do not constitute a novel element in the system although they are responsible for initiating the novel sequence of the steps which permit the subject system to operate in a completely automatic fashion.

Referring now to the valve assembly 24 shown in FIGS. 2A through 2D, therein is disclosed a housing 50 having inlet and outlet orifices corresponding to the lines 22, 26, 28, 32, 34 and 36 shown in FIG. 1 as being connected thereto.

Within the housing 50 are located a plurality of independently and/or conjunctively actuated valve seating members which, through mechanical or electromechanical means, are tied in with the program timer 25 of FIG. 1. Fluids entering the control valve 24 by way of the inlet line 22 are channeled to the upper portion of the housing or alternatively to the lower portion thereof dependent upon the relative position of the sealing disk 52 with respect to valve seats 54 and 56 respectively. When member 52 is in sealing relationship with the valve seat 56, fluid is channeled to the upper portion of the housing 50 and conducted therefrom by way of the line 26. The above outlined flow path is established during the "Service" cycle of the present system. During the service cycle fluids in the inlet line 22 leading to the control valve 24 are conducted into the filter tank 20 via the line 26.

Sealing member 52 is mounted on a valve stem 58 which at one end is connected to a spring-biased diaphragm assembly 60. Also mounted on the valve stem 58 is a second sealing member 62 which cooperates with a valve seat 64 to control the fluid flowing through the housing 50 between the two lines 28 and 34. In light of the fixed relationship of the sealing members 52 and 62 with respect to their common valve stem 58, the service cycle of the control valve 24 finds the fluid within the filter tank 20 being conducted through the housing 50 to line 34 which carries water through ejector 44 and thus eventually back to the primary flow path of the water cooling system.

Referring more particularly to FIG. 2B, therein are disclosed the operative flow paths through the control valve 24 during the "Backwash" cycle. As indicated above, during the course of the backwash cycle the dirt and other suspended matter which tend to accumulate in the upper strata of the filtering materials of the filter tank 20 are backflushed from the system by reversing the direction of flow of the fluids through the filter tank. Backflushing of a filter tank in this manner is conventional; however, the manner in which bleed off water is utilized in the practice of the present invention coupled with the fact that these operations are performed in a manner which is independent of any manual intervention enhances the operation of the present invention.

In the backwash operation, sealing members 52 and 62 cooperate with valve seats 54 and 64 respectively. Fluid entering the housing 50 by way of the inlet line 22 is conducted via a channel 66 to the line 28 leading into the filter tank 20. A sealing member 68 mounted on a stem 69 is withdrawn from its seating position with respect to valve seat 70 during the backwash operation to permit fluids entering the control valve 24 via the inlet line 22 to be conducted through the housing 50 by way of the channel 66 and thereafter enter the line 28. At the same time a sealing member 72 is rotatably withdrawn from sealing relationship with respect to a valve seat 74 to permit fluids within the filter tank 20 to be conducted through the housing 50 via line 26 and be ejected into the drain line 32.

The next phase of operation of the automatic control system involves the timed injection of chemicals into the system for the purpose of reducing scale, micro-organisms, and corrosion. Suitable additives which assist in the filtration process while reducing corrosion include chromates and nitrates preferably with a polymer additive. Polyphosphates are used to prevent scale formation. Other additives include chlorine for the control of micro-organisms.

In the preferred embodiment of the present invention the chemicals are fed from the tank 42 by way of the line 40 through the solenoid actuated hydraulic valve 38 and the ejector 44 directly into the primary flow path of the recirculating coolant. The control signal for actuating the hydraulic valve 38 is generated within the control valve 24. Referring to FIG. 2C, it will be noted that fluid flowing into the housing 50 from the inlet pipe 22 causes the ball 76 of a conventional ball check valve to move away from its seat 78 thereby generating a venturi effect at the orifice 80. The venturi, or low-pressure condition, developed at the orifice 80 generates a reduced pressure in the line 36 which in turn is used as a control signal to actuate the hydraulic valve 38. Inasmuch as the duration of the conditions which develop the low pressure across the orifice 80 are controllable in time, the duration of chemical feed to the system is likewise controllable.

Various alternative modes of operation in addition to that outlined above are available for feeding the chemicals into the system. This includes feeding the chemicals from the tank 42 directly into the control valve 24 via the line 36. In this mode of operation the partial vacuum created at the orifice 80 is effective in drawing chemicals into the channel 82 from where they are delivered to the upper portion of the housing 50 via a bypass channel 84 and are in turn conducted into the filter tank 20 via the outlet pipe 26. Once in the filter tank 20 the chemicals enter the fluid stream flowing back to the primary cooling path via the lines 28 and 34 and the ejector 44.

Because of the multiplicity of conditions occuring in a cooling tower which require chemical treatment, it is often the case that plural chemicals are needed. This may lead to a problem when an attempt is made to inject the chemicals simultaneously at a single point in the system. The problem arises in situations where two chemicals are incompatible when in concentrated form although they are capable of simultaneously subsisting within the system when diluted by the coolant fluids. By combining portions of each of the above-outlined operations for introducing chemicals into the system, one is able to simultaneously introduce two or more chemicals into the system without deleterious effects. In this respect a T-fitting is inserted in the orifice of the housing 50 normally served by the hydraulic line 36. The line 36 is attached to one side of the T-fitting and the signal generated across orifice 80 is effective in initiating the transfer of fluids from the tank 42 through the line 40, the solenoid-actuated valve 38, the ejector 44 and into the primary flow path as in the operation of the preferred embodiment of the present invention outlined above. To the other side of the T there is connected a line similar to line 36 which leads directly to a second chemical tank the contents of which are fed through the line 36 and into the filter tank 20 in the manner outlined above as an alternative mode for introducing chemicals into the system.

The operating cycles depicted in FIGS. 2A, B and C constitute the primary operations of the subject system; however, it may be desirable to provide a supplemental bleed off operation in which no backwashing of the filter is effected. Fig. 2D depicts the setting of the control valve 24 during such a supplemental bleed off operation.

Referring now to FIG. 2D it is noted that sealing member 52 cooperates with valve seat 56 while sealing member 62 is withdrawn from the valve seat 64. Fluid entering the control housing 24 via the inlet line 22 is directed into the filter tank 20 via the line 26. Likewise, fluid is withdrawn from the filter tank 20 via the line 28. This fluid reenters the control housing and is conducted via channel 86 past a sealing member 88 and associated valve seat 90 to the output line 32 and from there to the drain not shown.

The operation of the aforedescribed system will now be reviewed. Industrial cooling systems requiring the support of a cooling tower as hereinbefore described, are often designed to continuously operate throughout the year. In order to sustain continuous operation it is important that the service performed by the water tower 10 for the condenser 18 not be interrupted. The operation of the present invention is such that continuous operation of the cooling tower is assured without any interruptions therein. Thus, as the water recirculates from the cooling tower 10, through the pump 16 the condenser 18, and back again to the cooling tower, the filtering and chemical treating portion of the present invention continues to divert a portion of the cooling fluids through the secondary flow path including the control valve 24 and the filter tank 20 to thereby chemically treat the entire system. The major portion of operations of the present system are thus concentrated in the "Service" cycle wherein suspended matter in the fluid is continuously filtered by way of the filter tank 20. Chemical additives already introduced into the system are distributed during the service cycle to all portions of the system to thereby control corrosion, scale formation and the development of microorganisms. During this phase of operation fluid enters the filter tank 20 via the inlet line 22 and the control valve 24. It is thereafter conducted away from the fluid tank via the pipes 28 and 34 and the ejector 44.

Periodically the materials accumulated in the upper strata of the filter tank 20 are backwashed from the system. In this phase of operation the fluid being continuously diverted from the primary coolant path is used as the backwash medium, this being diverted through the control valve 24 in such fashion that it enters the filter tank 20 via the line 28 and exits therefrom via line 26 and is thereafter directed through the control valve 24 into the drain line 32 and from there to the drain. The backwash operation constitutes approximately 30 minutes of every 24-hour cycle; however, this figure is variable dependent upon the conditions of the system being cleaned. It is significant to note that inasmuch as the backwash operation is utilized to bleed off water from the system and for the most part the same operative components are used in the backwash operation as are used in the normal service cycle, there is little possibility that sediment will build up to clog the system and prevent bleed off. This problem is a real one insofar as conventional water towers are concerned.

The next operative cycle of the subject system is the chemical addition cycle during which time a signal is generated in the control valve 24 which in turn actuates the hydraulic valve 38 to permit fluids within the chemical tank 42 to enter the primary flow path via the ejector 44. Manual and automatic testing means are available to regulate the flow of chemicals to the system.

In actual operation the present system has proven itself by rejuvenating contaminated systems. In a typical case, the foreign particle count was effectively reduced by a factor of 10 in a 2-week period to thereby permit a 60 ton cooling system to continuously operate without the intervention of manual means.

By virtue of the present system cooling towers which heretofore have required close supervision to maintain an efficient operating condition are now capable of operating essentially independent of manual intervention other than to periodically refurbish the supply of chemicals being utilized therein.

We claim:

1. An apparatus for automatically maintaining the chemical integrity of cooling fluids used in a recirculation-type cooling system comprising a primary flow path including a cooling tower, a pump for circulating said cooling fluid through said system, and a load cooled thereby; a secondary flow path through which a portion of the fluids passing through the primary flow path pass before being returned to said primary flow path, said secondary flow path including a filtering medium, control means comprising a program-controlled multiposition valve positioned in said secondary flow path for simultaneously bleeding off contaminated cooling fluid and cleaning said filtering medium by periodically reversing the flow of fluids through said filter for backwashing purposes and ejecting from the system the fluids used to backwash the filter, said control means further including means operative in response to a low-pressure signal generated in said program-controlled multiposition valve to chemically restore the fluids flowing through the secondary flow path, and means operative through said control means to bleed off additional fluids from the system so as to maintain the chemical content of the cooling fluid at its original value.

2. In a fluid-cooling system of the recirculation type, a pump for pumping cooling fluid through said system, programmable control means for cleaning and treating said system on a periodic basis, a filtering medium operatively connected in said system, said control means further comprising a program-controlled multiposition valve operatively connected to said filtering medium to normally filter the fluid passing therethrough, said control valve being further operative to periodically backwash said filter by reversing the direction of flow of the fluid passing through said filtering medium and discharge from the system the fluid used for backwashing purposes, means to add makeup fluids to the system, said last named means including said multiposition valve being further operative upon the completion of each such backwash operation to initiate the addition of chemical additives to the system for a predetermined time, and means including said program-controlled multiposition valve operative upon the completion of said chemical additive cycle to initiate a rinse cycle during which contaminated fluids in addition to those discharged from the system during the backwash operation are bleed off from the system whereby the chemical composition of said cooling fluid may be maintained at essentially a constant value.

3. In a fluid-cooling system of the recirculation type, a primary flow path including a cooling tower and a load, a pump positioned in said primary flow path for forcibly circulating cooling fluid through said cooling tower and said load, a secondary flow path connected to said primary flow path and continuously diverting a portion of the cooling fluid therefrom, a programmable control valve positioned in said secondary flow path, said control valve having a plurality of orifices and means for independently gating fluid therethrough, means for conducting fluids diverted into said secondary flow path through a first one of said orifices and into said control valve, a filter having an inlet and outlet, means connecting a second orifice of said control valve to the inlet of said filter and a third orifice of said control valve to the outlet of said filter, a line connected to a fourth orifice of said control valve for returning fluids directed therethrough to the primary flow path, a fifth orifice of said control valve being connected to a drain; said control valve being normally operative to conduct fluids entering said control valve via said first orifice therethrough to said second orifice and from thence into the inlet side of said filter and for returning filtered fluids to said control valve via the outlet side of said filter and said third orifice, and from thence to the primary flow path by way of said fourth orifice and the associated return line of said secondary flow path; said control valve being periodically reset to cause fluids which enter the control valve via said first orifice to pass into said filter via the third orifice and to reenter the control valve via the second orifice and to be thereafter discharged from the system via said fifth orifice which is in turn connected to the drain; said control valve being further provided with a sixth orifice, and means connected to said sixth orifice to initiate the transfer of chemicals from a suitable supply to the secondary flow path and from thence to the primary flow path of said fluid-cooling system.

* * * * *